United States Patent [19]

Basso

[11] Patent Number: 5,567,936
[45] Date of Patent: Oct. 22, 1996

[54] LIGHT EMITTING DIODE REFERENCE LOCKET

[75] Inventor: Michael J. Basso, Ocean, N.J.

[73] Assignee: The United States of America as represented by the Secretary of the Army, Washington, D.C.

[21] Appl. No.: 494,612

[22] Filed: Jun. 23, 1995

[51] Int. Cl.⁶ .......................... G01D 18/00; G12B 13/00; G01T 3/08
[52] U.S. Cl. .................. 250/252.1; 250/370.05; 250/370.07; 250/390.03; 250/392; 250/484.5; 250/474.1
[58] Field of Search ...................... 250/252.1 R, 370.05, 250/370.07, 390.03, 392, 474.1, 484.5, 252.1 A

[56] References Cited

U.S. PATENT DOCUMENTS 3,868,511  2/1975  Basso et al. ............................. 250/376
4,191,886  3/1980  Basso et al. ............................. 250/376
4,544,843  10/1985 Kern et al. ........................ 250/252.1 A

FOREIGN PATENT DOCUMENTS 0228086  10/1985  German Dem. Rep. ........ 250/252.1 A 59-046573  3/1984  Japan .............................. 250/252.1 A Primary Examiner—Constantine Hannaher
Assistant Examiner—Virgil Orlando Tyler
Attorney, Agent, or Firm—Michael Zelenka; William H. Anderson

[57] ABSTRACT

A reference locket for use in calibrating a radiac computer indicator or instrument having a light emitting diode or LED. The present invention is an inexpensive stable device having a base, a retainer placed in the base holding a light emitting diode or LED, and a cover forming a reference locket. The reference locket is placed in a radiac computer indicator or instrument for calibration. A forward constant current pulse provided to the LED results in electromagnetic radiation or light that simulates a gamma dose. The characteristic junction resistance of the LED simulates a neutron reading. The present invention replaces a conventional reference locket having a silver activated phosphate glass and a neutron diode. The phosphate glass blocks have exhibited unexplained increases in the previously calibrated gamma doses. Therefore, calibration or reference lockets using phosphate glass may be unstable. The present invention provides a stable, inexpensive reference locket used for calibration of a radiac computer indicator or instrument without modification to the existing instrument.

6 Claims, 5 Drawing Sheets

LIGHT EMITTING DIODE REFERENCE LOCKET

GOVERNMENT INTEREST

The invention described herein may be manufactured, used, and licensed by or for the United States Government for governmental purposes without the payment to me of any royalty thereon.

FIELD OF THE INVENTION

This invention relates in general to gamma and neutron radiation dose measuring instruments, and particularly to the calibration of neutron and gamma radiation dose instruments.

BACKGROUND OF THE INVENTION

In many applications, it is desirable to obtain the radiation dose in which a person or equipment have been exposed. This is particularly applicable in the military where personnel may be exposed to radiation from tactical nuclear weapons. There exists radiac detectors or dosimeter lockets that are worn by personnel for measuring the accumulated neutron and gamma radiation dose that personnel may be subjected to. The radiac detector or dosimeter locket is placed in a radiac computer indicator or instrument to measure the accumulated neutron and gamma radiation dose to which the radiac detector or dosimeter locket, and as a result the personnel, have been exposed to. However, before an accurate reading can be obtained from the radiac computer indicator or instrument, it must be calibrated. A plurality or a number of calibration reference lockets are associated with the radiac computer indicator or instrument. A calibration or reference locket set typically consists of six specially prepared dosimeters for activation and calibration of the gamma and neutron channels in the radiac computer indicator. Each of the calibration or reference lockets contain a silver activated phosphate glass which has been previously exposed to a predetermined radiation dose, and a precision resistor. The silver activated phosphate glass is used to calibrate the gamma channel, and the precision resistor is used to calibrate the neutron channel. The silver activated phosphate glass in each of the calibration or reference lockets is purposely masked to provide a range of calibrated gamma dose readings. The precision resistor in each calibration or reference locket is varying to give a precise neutron dose reading.

However, the silver activated phosphate glass may be unstable and there have been instances of unexplained increases in the previously calibrated gamma dosed glass. Additionally, the calibration of reference lockets are relatively expensive. Therefore, there is a need for an alternate device and method to both activate and calibrate the neutron and gamma channels of a radiac computer indicator or instrument and to maintain a calibrated reference with regard to the calibrated gamma doses associated with the calibration or reference lockets. The device or method should be compatible with existing radiac computer indicators or instruments.

SUMMARY OF THE INVENTION

The present invention is directed to a reference or calibration locket used for activating and calibrating the gamma and neutron channels of a radiac computer indicator or instrument. The calibration or reference locket of the present invention uses a light emitting diode (LED) to provide both light intensity and a constant electrical resistance to activate and calibrate the neutron and gamma channels of the radiac computer indicator or instrument. The light from the LED simulates the signal from a silver activated phosphate glass, and the electrical resistance associated with the LED silicone junction simulates the resistance of a precision resistor. The LED is placed within a retainer having electrical contacts, which is placed in a base and covered. This assembly forms a reference or calibration locket that is placed in existing radiac computer indicators or instruments and aids in calibration.

Accordingly, it is an object of the present invention to provide an alternate means to calibrate an existing radiac computer indicator or instrument.

It is a further object of the present invention to provide a calibration or a reference locket that is compatible with existing radiac computer indicators or instruments.

It is an advantage of the present invention that it is relatively inexpensive.

It is a further advantage of the present invention that it is stable over time.

It is a feature of the present invention that a commercial quality light emitting diode is used.

It is another feature of the present invention that the LED may be angularly positioned to simulate different gamma doses.

These and other objects, advantages, and features will become readily apparent in view of the following more detailed description.

DETAILED DESCRIPTION OF THE PREFERRED EMBODIMENT

Figure 1:
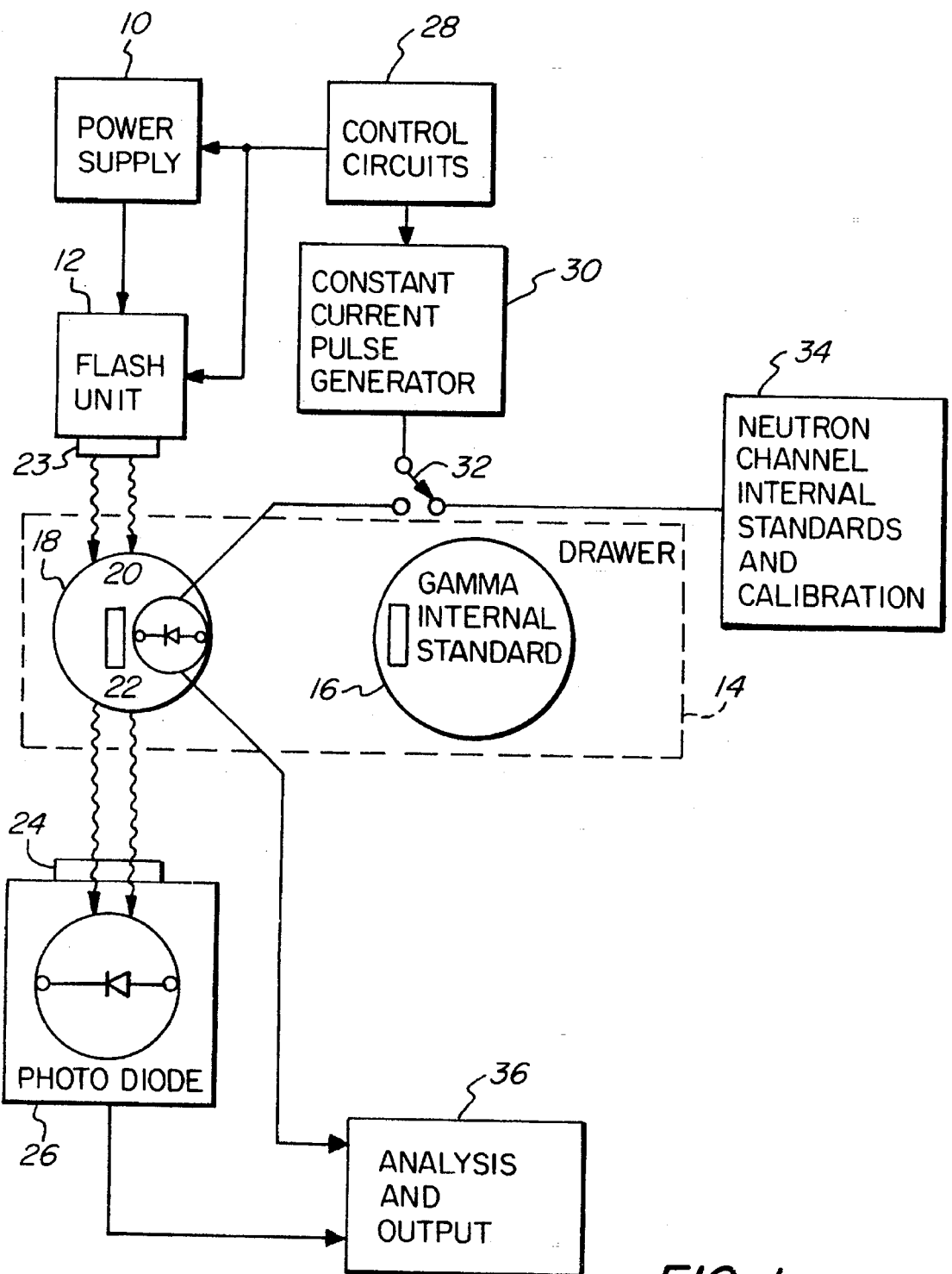
FIG. 1 is a schematic illustration of an prior radiac computer indicator or instrument.
Figure 2:
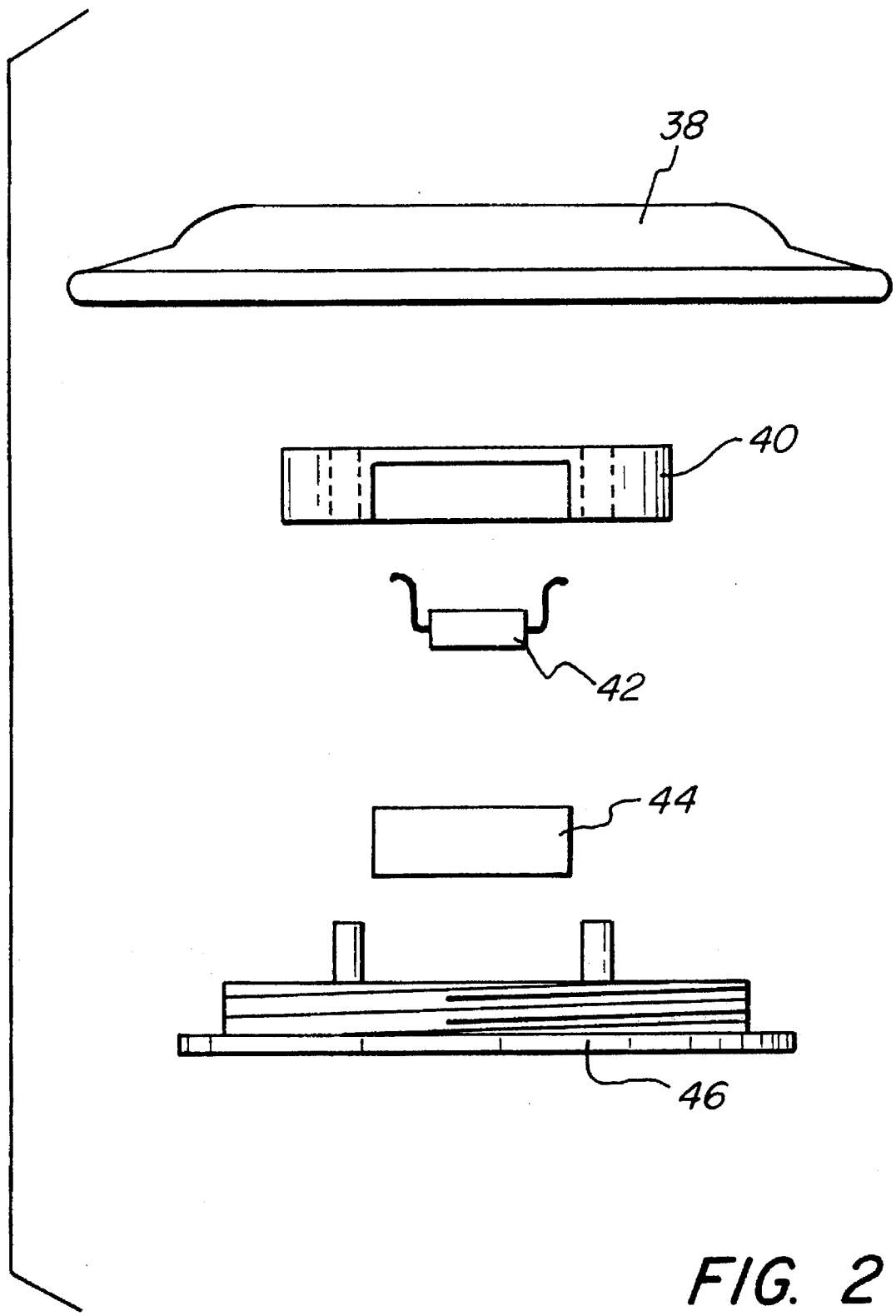
FIG. 2 is an exploded view of a prior art calibration or reference locket.

The present invention can best be appreciated by briefly describing the structure and operation of the existing radiac computer indicator or instrument and dosimeter locket. FIGS. 1 and 2 therefor illustrate the existing devices from which the present invention is adapted to improve and work with. FIG. 1 illustrates an existing radiac computer indicator or instrument and dosimeter locket 18. A power supply 10 provides power to a flash unit 12. The flash unit 12 provides an intense electromagnetic radiation or light pulse to a dosimeter locket 18 through a UV band pass filter 23. Dosimeter locket 18 is placed in a drawer 14. Drawer 14 can be slid in and out of the radiac computer indicator or instrument. At the rear of the drawer 14 is a gamma internal standard 16. The internal standard 16 is preset to simulate a dosimeter that has been subjected to a predetermined radiation dose. The dosimeter locket 18 contains a treated phosphate glass block 20 that records gamma radiation. The phosphate glass block 20 fluoresces blue/green under ultraviolet light if it has not been irradiated. Gamma radiation changes the phosphate glass block 20 so that it fluoresces orange/red under ultraviolet light. The intensity of the fluorescence is proportional to the cumulative gamma radiation dose. The dosimeter locket 18 also contains a neutron diode 22. The neutron diode 22 records neutron radiation. The neutron radiation causes changes in the crystal lattice of the neutron sensitive silicon PIN diode 22, which increases the neutron diode 22 forward voltage. Across or opposite from the flash unit 12 is positioned a red pass filter 24 and a photo diode 26. The photo diode 26 detects oranges/red light emitted by the phosphate glass block 20 that passes through the red filter 24. The photo diode 26 produces a current pulse with an amplitude proportional to the amount of electromagnetic radiation or light detected. The signal from the photo diode 26 is directed to analysis and output 36. The analysis and output 36 may comprise existing or conventional electronics, such as a CPU, for analyzing the signal received and calculating the radiation dose using known techniques. The gamma radiation dose to which the phosphate glass 20 has been subjected is thereby indicated. The flash unit 12, phosphate glass 20, and photo diode 26 are part of the gamma channel. Control circuits 28 control the power supply 10 and the flash unit 12, as well as a constant current pulse generator 30. The constant current pulse generator 30 produces a diode sampling current. This sampling current is supplied to the neutron sensitive silicone PIN diode 22 through switch 32. The output voltage across the neutron diode PIN junction 22 is coupled to analysis and output 36. Analysis and output 36 processes the signal from the neutron diode 22. From the analysis and output 36, an indication of the neutron radiation dose to which the neutron diode 22 has been subjected is obtained. Switch 32 may also be positioned for coupling with the neutron channel internal standards and calibration 34. The neutron channel internal standards and calibration 34 provides an internal standard for a predetermined dose of radiation. The current pulse generator 30 and the neutron dose diode 22 form part of the neutron channel.

FIG. 2 illustrates an existing reference locket. A retainer 40 holds a precision resistor 42 and a predosed phosphate glass 44. The retainer 40 is positioned in a base 46. A cover 38 is threaded onto the base 46 holding the assembly together. The reference locket is then placed into the radiac computer indicator or instrument, as illustrated in FIG. 1. The phosphate glass 44 is pre-exposed to a predetermined dose of radiation. The precision resistor 44 is selected to simulate a predetermined dose of radiation. The reference locket illustrated in FIG. 2 is used to calibrate the gamma and neutron channels in the radiac computer indicator or instrument illustrated in FIG. 1.

Figure 3:
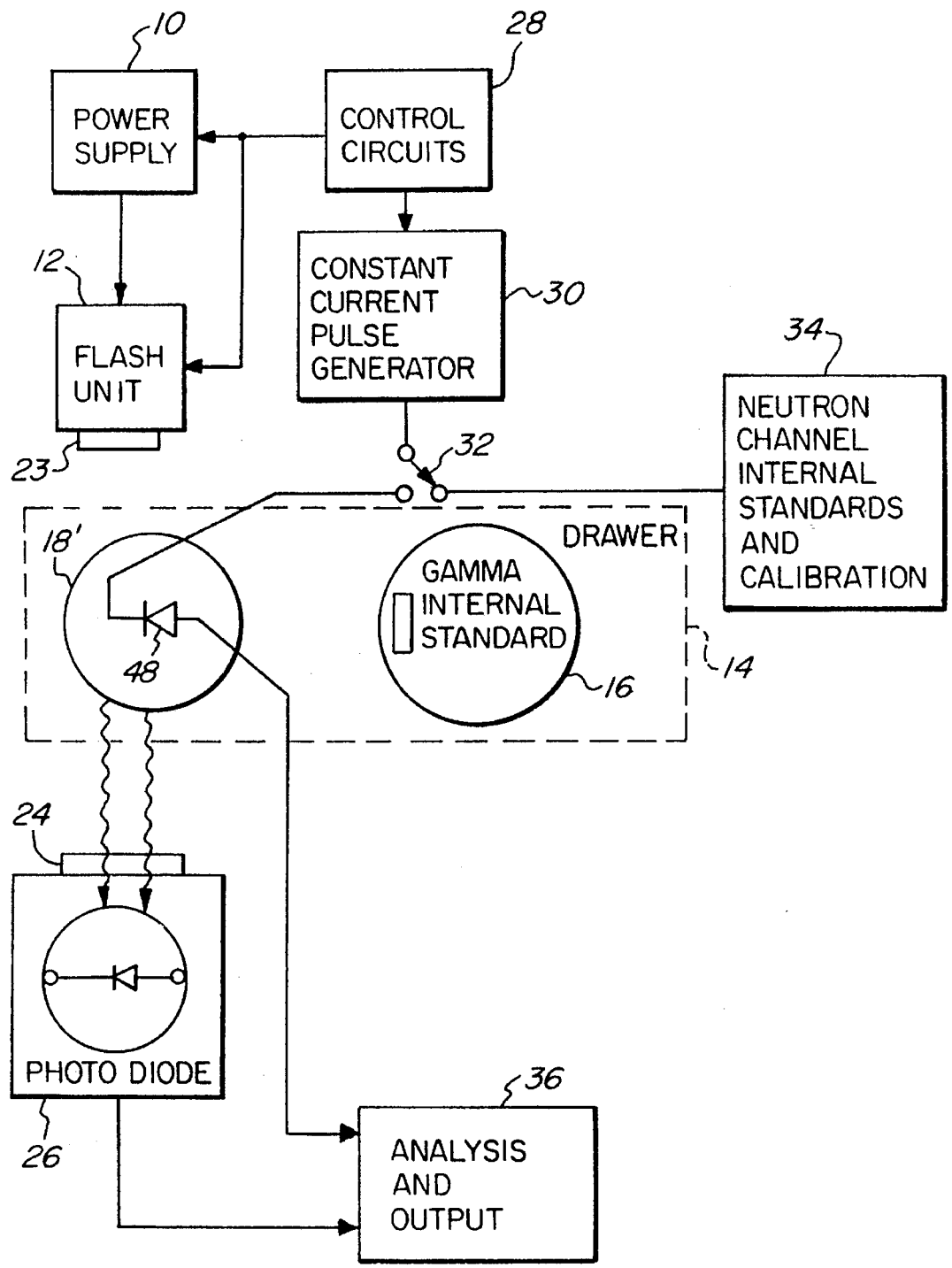
FIG. 3 is a schematic illustration of a radiac computer indicator or instrument using an embodiment of the present invention.

FIG. 3 schematically illustrates a reference locket of the present invention placed in a radiac computer indicator or instrument. FIG. 3 is similar to FIG. 1 as described above, with the exception that the reference locket 18' of the present invention is placed within drawer 14. The reference locket 18' is comprised of a light emitting diode or LED 48. The light emitting diode or LED 48 is coupled to the constant current pulse generator 30 through switch 32. The LED 48 is also coupled to analysis and output 36. Upon activation of the LED 48 by a constant current pulse generator 30, electromagnetic radiation or light is emitted. The electromagnetic radiation or light is detected by photo diode 26. The LED 48 provides both light intensity to simulate a signal from the phosphate glass block and a constant electrical resistance to simulate the resistance of a precision resistor. The constant electrical resistance is associated with the LED silicone junction. The reference locket 18', using the LED 48, provides an alternate means to activate and calibrate the neutron and gamma channels of the radiac computer indicator or instrument. Additionally, the reference locket 18' of the present invention provides a means for monitoring the reference lockets using a phosphate glass which may vary with time.

The luminosity of the LED 48, detected by the photo diode 26, may vary depending upon the forward current through the LED 48. For a radiac computer indicator or instrument having a constant current pulse generator 30 generating a current of 25 milliamps having a plus or minus variance of 0.2 would result in a maximum difference in luminosity of ±1.1% and in turn a ±1.1% difference in gamma dose measured. The luminosity will also vary, depending upon the LED characteristic junction resistance. The junction resistance is often dependent upon the manufacturing process and a variation is often held to a minimum with a production quality LED. With a forward current of 25 milliamps, the luminosity will vary approximately 10% for every ±7 ohms difference in the average LED junction resistance of 91.316 ohms. Since the gamma dose is proportional to the light output, any difference in junction resistance will translate into an observed difference in simulated gamma dose readings. Therefore, each LED, with its own junction resistance, may be read and assigned a calibrated gamma dose as a standard.

Data was accumulated utilizing LED calibration lockets and an empirical expression was derived to define the relationship between simulated gamma and simulated neutron dose. The expression is given as follows:

$$G=32.81N-33529.79$$

where,
G is equal to the gamma dose, and
N is equal to the neutron dose,
given in units of cGy for $100 \leq N \leq 140$.

Figure 4:
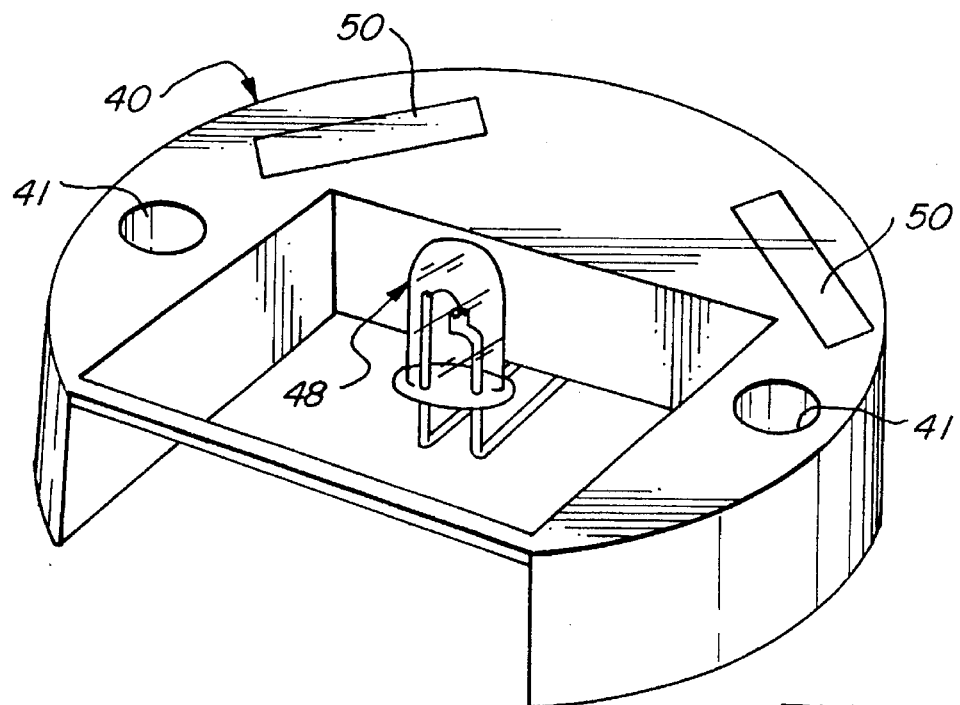
FIG. 4 is a perspective view of part of an embodiment of the present invention.

FIG. 4 illustrates a retainer 40 of the present invention holding the LED 48. The LED 48 is connected to contacts 50 through the bottom of the retainer 40. The LED 48 is positioned such that its longitudinal axis is perpendicular to the plane of the retainer 40 and is approximately centered within the rectangular opening in the retainer 40. The retainer 40 is adapted to fit within a base. Guide holes 41 are formed in the retainer 40 to assist in aligning the retainer 40 within the base.

Figure 5:
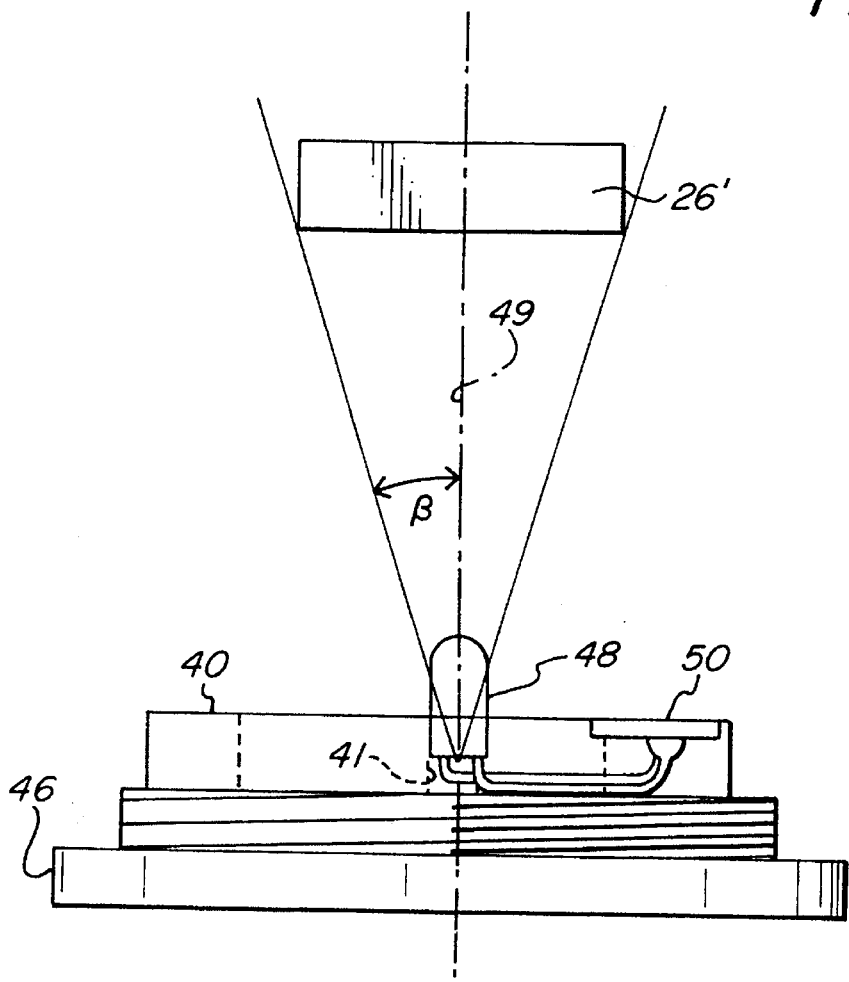
FIG. 5 is an illustrated view of the angular position of an LED.

FIG. 5 illustrates the effective of diode position on the measurement of incident electromagnetic radiation or light on a photo diode 26'. FIG. 5 shows the retainer 40 placed within a base 46. The physical orientation of the LED 48 is the decisive parameter that provides a method of varying the simulated gamma dose readings. Varying the angle beta (β) from the longitudinal axis 49 of the LED 48 will directly vary the amount of electromagnetic radiation or light detected by photo diode 26'. The angle beta may vary for zero to ninety degrees. The Zero angle being substantially perpendicular to the planar surface of the retainer 40, and ninety degrees being substantially parallel to the planar surface of the retainer 40. The beta (β) angle could therefore range from approximately zero to ninety degrees. Generally, the luminosity will decrease with an increasing beta (β) angle.

Figure 6:
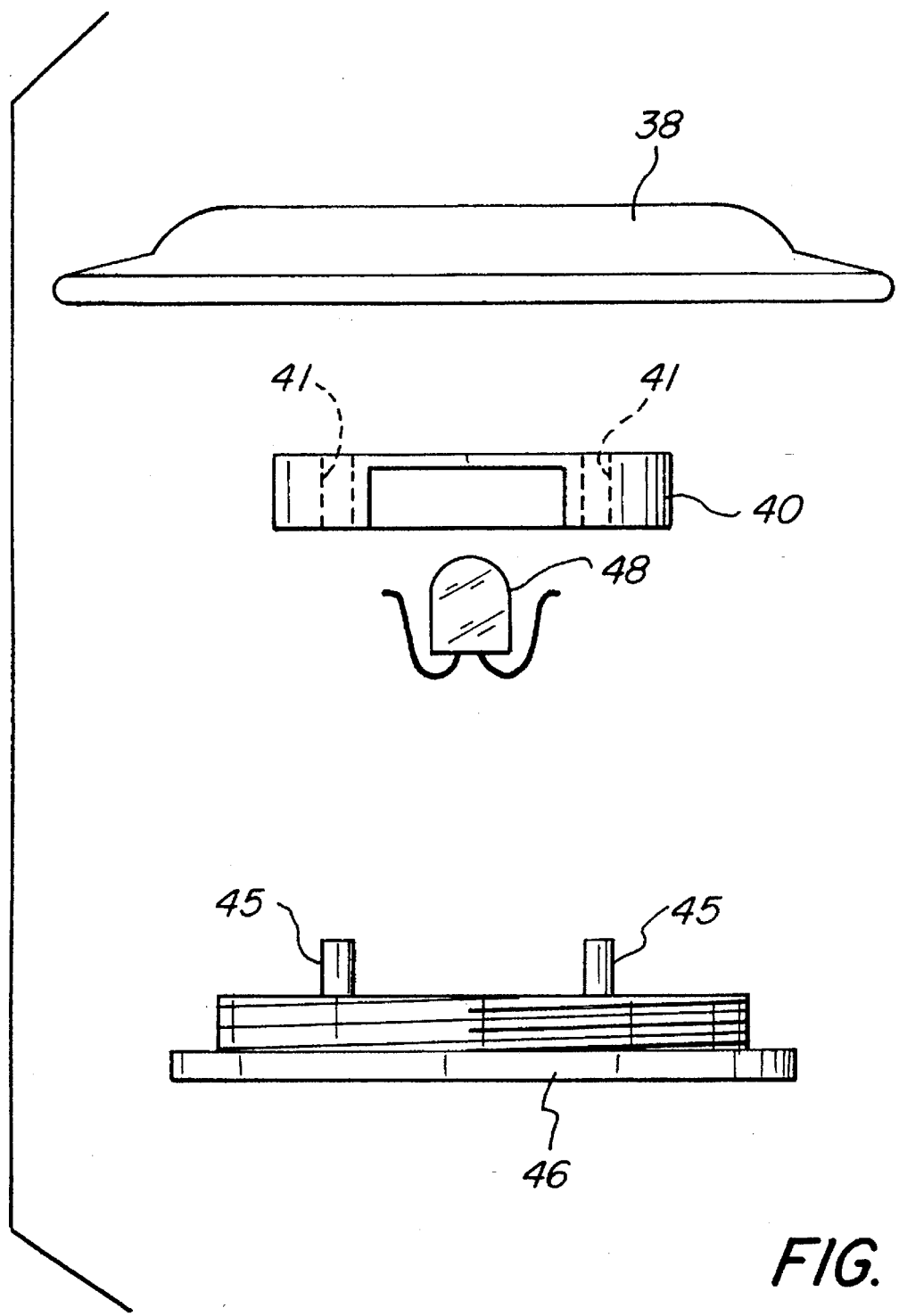
FIG. 6 is an exploded view of an embodiment of the present invention.

FIG. 6 illustrates an exploded view of one embodiment of the present invention. The retainer 40 holds the LED 48. The retainer 40 also has guide holes 41 therein. The retainer 40 holding the LED 48 is placed in a base 46. Base 46 has male threads thereon. Base 46 also has formed thereon guide pins 45 that mate with the guide holes 41 in retainer 40. Covering the retainer 40 and LED 48 is a transparent cover 38. Cover 38 has female threads, not shown, that mate with the male threads on base 46. This reference locket assembly of the present invention is relatively simple, and less expensive than prior reference lockets using a phosphate glass and precision resistor.

LED reference lockets were made with a different LEDs. Red, green, and amber LEDs were used in LED reference lockets and placed in a radiac computer indicator or instrument. The LED locket using a red LED provided both a simulated gamma and neutron dose reading. The red LED used in the LED reference locket has an electromagnetic wave length of approximately 650 nanometers and is commercially available. The green LED used in a LED reference locket provided only a simulated neutron dose reading. The green electromagnetic radiation or light emitted by the green LED was not detected due to the use of a red pass filter 24 as illustrated in FIGS. 1 and 2. Also, the amber LED used in the LED reference locket provided only a simulated neutron dose.

Accordingly, the present invention provides a relatively stable and inexpensive reference locket that can be used to calibrate a radiac computer indicator or instrument. The LED used in the present invention is commercially available. Accordingly, the present invention is an alternate method to activate and calibrate existing radiac computer indicators or instruments without modification. The LED locket of the present invention provides an inexpensive training locket, as well as providing a cross check in the field of the stability of reference lockets using phosphate glass.

Although the preferred embodiment has been illustrated and described, it will be obvious to those skilled in the art that various modifications may be made without departing from the spirit and scope of this invention.

What is claimed is:

1. A reference locket for calibrating a radiac computer indicator or instrument used in detecting a gamma and neutron radiation dose comprising:

a base;

a retainer having a planar surface and a rectangular opening therein;

a light emitting diode having a longitudinal axis placed within said retainer and extending through the rectangular opening, the longitudinal axis of said light emitting diode positioned at a predetermined angle with respect to the planar surface of said retainer;

electrical contacts connecting said light emitting diode to said retainer; and a cover adapted to mate with said base.

2. A reference locket as in claim 1 wherein:

the predetermined angle is selected depending on the simulated gamma dose desired.

3. A reference locket as in claim 2 wherein:

the predetermined angle between zero and ninety degrees.

4. A reference locket as in claim 1 wherein:

said light emitting diode is a red light emitting diode.

5. A reference locket as in claim 4 wherein:

said red light emitting diode produces electromagnetic radiation having a wavelength of approximately 650 nanometers.

6. A device for measuring a simulated gamma and neutron radiation dose comprising:

control circuits;

a constant current pulse generator coupled to said control circuits;

a light emitting diode coupled to said constant current pulse generator;

a detector positioned in relation to said light emitting diode so as to receive electromagnetic radiation therefrom;

analysis and output means, coupled to said light emitting diode and said detector, for calculating a simulated gamma and neutron radiation dose.

* * * * *